(12) United States Patent
Peng et al.

(10) Patent No.: US 11,762,188 B2
(45) Date of Patent: *Sep. 19, 2023

(54) REFLECTIVE EYEPIECE OPTICAL SYSTEM AND HEAD-MOUNTED NEAR-TO-EYE DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,261

(22) Filed: Aug. 2, 2022

(65) Prior Publication Data
US 2023/0044295 A1 Feb. 9, 2023

(30) Foreign Application Priority Data

Aug. 2, 2021 (CN) .......................... 202110879666.9

(51) Int. Cl.
| | |
|---|---|
| G02B 25/00 | (2006.01) |
| G02B 15/14 | (2006.01) |
| G02B 9/12 | (2006.01) |
| G02B 17/08 | (2006.01) |
| G02B 27/01 | (2006.01) |

(52) U.S. Cl.
CPC .............. *G02B 25/001* (2013.01); *G02B 9/12* (2013.01); *G02B 15/1421* (2019.08); *G02B 17/08* (2013.01); *G02B 17/0896* (2013.01); *G02B 27/0172* (2013.01); *G02B 2027/013* (2013.01);
(Continued)

(58) Field of Classification Search
CPC ........ G02B 27/0172; G02B 2027/0123; G02B 2027/0127; G02B 2027/013; G02B 17/08–0896; G02B 25/001
See application file for complete search history.

(56) References Cited

U.S. PATENT DOCUMENTS 5,646,783 A * 7/1997 Banbury ............ G02B 27/0176
359/630
6,646,811 B2 * 11/2003 Inoguchi .............. G02B 27/144
359/639
(Continued)

FOREIGN PATENT DOCUMENTS

CN 111965824 A * 11/2020 ......... G02B 27/0172
WO WO-2021042891 A1 * 3/2021

*Primary Examiner* — Nicholas R. Pasko
(74) *Attorney, Agent, or Firm* — Nitin Kaushik

(57) ABSTRACT

The present invention relates to a reflective eyepiece optical system and a head-mounted near-to-eye display device. The system includes: a first lens group, a first optical element and a second lens group for transmitting and reflecting light from a miniature image displayer; the second lens group includes an optical reflection surface, and the optical reflection surface is the optical surface farthest from a human eye viewing side in the second lens group; the optical reflection surface is concave to human eyes; the first optical element reflects the light refracted by the first lens group to the second lens group, and then transmits the light refracted, reflected and again refracted by the second lens group to the human eyes.

19 Claims, 12 Drawing Sheets

(52) U.S. Cl.
    CPC ............... *G02B 2027/0123* (2013.01); *G02B 2027/0127* (2013.01); *G02B 2027/0132* (2013.01)

(56) References Cited

U.S. PATENT DOCUMENTS

| | | | |
|---|---|---|---|
| 10,394,036 B2 * | 8/2019 | Hua | H04N 13/344 |
| 11,480,782 B1 * | 10/2022 | Peng | G02B 17/08 |
| 2006/0119951 A1 * | 6/2006 | McGuire | G02B 27/1026 |
| | | | 359/630 |
| 2015/0192775 A1 * | 7/2015 | Suzuki | G02B 27/0101 |
| | | | 359/630 |
| 2016/0320619 A1 * | 11/2016 | Watanabe | G02B 3/06 |
| 2017/0075096 A1 * | 3/2017 | Shi | G02B 17/08 |

\* cited by examiner

REFLECTIVE EYEPIECE OPTICAL SYSTEM AND HEAD-MOUNTED NEAR-TO-EYE DISPLAY DEVICE

CROSS-REFERENCE TO RELATED APPLICATIONS

The application claims priority to Chinese patent application No. 202110879666.9, filed on Aug. 2, 2021, the entire contents of which are incorporated herein by reference.

TECHNICAL FIELD

The present invention relates to the field of optical technology, and more particularly, to a reflective eyepiece optical system and a head-mounted near-to-eye display device.

BACKGROUND

With the development of electronic devices to ultra-miniaturization, head-mounted display devices and products are constantly emerging in military, industrial, medical, educational, consumption and other fields, and in a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to satisfy the above optical properties at the same time.

In Patent Document 1 (Chinese Patent Publication No. CN101915992A), Patent Document 2 (Chinese Patent Publication No. CN211698430U), Patent Document 3 (Chinese Patent Publication No. CN106662678A), and Patent Document 4 (Chinese Patent Publication No. CN105229514A), a reflective optical system utilizing a combination of traditional optical spherical surfaces and even-order aspherical face shapes is provided respectively, wherein Patent Document 1 adopts a relay scheme, but this scheme adopts a free-form surface reflection means, which greatly increases the difficulty of realizing the entire optical system; the optical systems in the Patent Document 2, Patent Document 3 and Patent Document 4 use reflective optical systems, but the basic optical structures vary greatly from one to another due to different application fields, such as in terms of a matching relationship between a lens face shape and a gap between the lenses.

Patent Document 5 (Chinese Patent Publication No. CN207081891U) and Patent Document 6 (Chinese Patent Publication No. CN108604007A) provide an eyepiece optical system that adopts a reflex means, which ensures high-quality imaging; however its optical structure is often limited to single lens reflection, thereby greatly limiting a performance ratio of the entire optical structure.

To sum up, the existing optical structures not only have problems such as heavy weight, small field-of-view angle, and insufficient optical performance, but also have problems such as difficulty in processing and mass production due to the difficulty of implementation.

SUMMARY

The technical problem to be solved by the present invention is that the existing optical structure has the problems of heavy weight, low image quality, distortion, insufficient field-of-view angle, and difficulty in mass production. Aiming at the above-mentioned defects of the prior art, a reflective eyepiece optical system and a head-mounted near-to-eye display device are provided.

The technical solutions adopted in the present invention to solve the technical problem thereof are as follows: constructing a reflective eyepiece optical system, including: a first lens group, a first optical element and a second lens group for transmitting and reflecting light from a miniature image displayer; the second lens group comprises an optical reflection surface, and the optical reflection surface is the optical surface farthest from a human eye viewing side in the second lens group; the optical reflection surface is concave to the human eyes; the first optical element reflects the light refracted by the first lens group to the second lens group, and then transmits the light refracted, reflected and again refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, $f_2$ satisfy the following relations (1), (2):

$$f_1/f_w < -0.50 \quad (1);$$

$$f_2/f_w < -0.70 \quad (2);$$

the first lens group comprises a first sub-lens group and a second sub-lens group arranged coaxially and successively along the optical axis direction from a human eye viewing side to the miniature image displayer side; the effective focal lengths of the first sub-lens group and the second sub-lens group are a combination of positive and negative; the effective focal length of the first sub-lens group is $f_{11}$, the effective focal length of the second sub-lens group is $f_{12}$, and $f_{11}$, $f_{12}$ and $f_1$ satisfy the following relations (3), (4):

$$0.59 < f_{11}/f_1 \quad (3);$$

$$f_{12}/f_1 < -0.90 \quad (4).$$

Further, the distance along the optical axis between the first optical element and the second lens group is $d_1$, the distance along the optical axis between the first optical element and the first lens group is $d_2$, and $d_1$ and $d_2$ satisfy the following relation (5):

$$0.69 < d_2/d_1 \quad (5).$$

Further, a maximum effective optical caliber of the second lens group is $\varphi_2$, and $\varphi_2$ satisfies the following relation (6):

$$\varphi_2 < 70 \text{ mm} \quad (6).$$

Further, the first sub-lens group is composed of two lenses; wherein the first sub-lens group includes a first lens and a second lens that are coaxially arranged successively along the optical axis from the human eye viewing side to the miniature image displayer side; both the first lens and the second lens are positive lenses.

Further, the effective focal length of the first lens is $f_{111}$, the effective focal length of the first sub-lens group is $f_{11}$, and $f_{111}$ and $f_{11}$ satisfy the following relation (7), $$2.41 < |f_{111}/f_{11}| \tag{7}$$

Further, the optical surface of the first lens proximate to the human eye viewing side is convex to the human eyes.

Further, the second sub-lens group comprises a third lens adjacent to the first sub-lens group; the optical surface of the third lens proximate to the miniature image displayer side is concave to the miniature image displayer; the third lens is a negative lens; the effective focal length of the third lens is $f_{121}$, and $f_{121}$ satisfies the following relation (8):

$$f_{121} < -9.7 \tag{8}$$

Further, the second lens group comprises a fourth lens adjacent to the first optical element; the optical reflection surface is located on the optical surface of the fourth lens distant from the human eyes.

Further, the second lens group comprises a fourth lens and a fifth lens adjacent to the first optical element; the fourth lens and the fifth lens are arranged successively along an incident direction of an optical axis of human eyes; the optical reflection surface is located on the optical surface of the fourth lens distant from the human eyes.

Further, the effective focal length of the optical reflection surface is $f_{S2}$, and the effective focal length of the second lens group is $f_2$, $f_2$ and $f_{S2}$ satisfy the following relation (9):

$$0.46 \leq f_{S2}/f_2 \leq 1.0 \tag{9}$$

Further, the first optical element is a planar transflective optical element, a reflectivity of the first optical element is $Re_1$, and $Re_1$ satisfies relation (10):

$$20\% < Re_1 < 80\% \tag{10}$$

Further, a reflectivity of the optical reflection surface is $Re_2$, and $Re_2$ satisfies relation (11):

$$20\% < Re_2 \tag{11}$$

Further, an angle of optical axis between the first lens group and the second lens group is $\lambda_1$, and $\lambda_1$ satisfies relation (12):

$$55° < \lambda_1 < 120° \tag{12}$$

Further, the effective focal length $f_1$ of the first lens group, the effective focal length $f_{11}$ of the first sub-lens group, the effective focal length $f_{12}$ of the second sub-lens group, and the effective focal length $f_{111}$ of the first lens further satisfy the following relations (13), (14), (15):

$$0.65 < f_{11}/f_1 < 0.67 \tag{13}$$

$$2.41 < f_{111}/f_{11} < 14.10 \tag{14}$$

$$-1.75 < f_{12}/f_1 < -0.90 \tag{15}$$

Further, the first lens group comprises one or more even-order aspherical face shapes; the optical surface of the fourth lens is even-order aspherical face shapes; the optical reflection surface is even-order aspherical face shape.

Further, the even-order aspherical face shapes satisfy the following relation (16):

$$z = \frac{cr^2}{1 + \sqrt{1 - (1+k)c^2 r^2}} + \alpha_2 r^2 + \alpha_4 r^4 + \alpha_6 r^6 + \ldots. \tag{16}$$

Further, the material of each lens in the second lens group is an optical plastic material.

The present application provides a head-mounted near-to-eye display device, including a miniature image displayer, and further including the reflective eyepiece optical system according to any one of the foregoing content; the eyepiece optical system is located between the human eyes and the miniature image displayer.

Further, the miniature image displayer is an organic electroluminescent device.

Further, the head-mounted near-to-eye display device includes two identical reflective eyepiece optical systems.

The present invention has the following beneficial effects: the first optical element and the second lens group have transmission and reflection properties, the second lens group includes a reflection surface, the eyepiece optical system composed of the first lens group, the second lens group and the first optical element is used for effectively folding the optical path, which reduces the overall size of the eyepiece optical system and improves the possibility of subsequent mass production, the first lens group includes a first sub-lens group and a second sub-lens group, and the first sub-lens group and the second sub-lens group adopt a combination of positive and negative. On the basis of miniaturization, cost and weight reduction for the article, the aberration of the optical system is greatly eliminated, and the basic optical indicators are also improved, ensuring high image quality and increasing the size of the picture angle. Thus an observer can watch large images of full frame, high definition and uniform image quality without any distortion and get visual experience of high liveness via the present invention, which is suitable for near-to-eye displays and similar devices thereof.

BRIEF DESCRIPTION OF THE DRAWINGS

In order to illustrate the embodiments of the present invention or the technical solutions in the prior art more clearly, the present invention is further illustrated combining the embodiments and drawings attached. The drawings in the following description are only some embodiments of the present invention. For one of ordinary skill in the art, other drawings may be obtained from these drawings without any inventive work.

DETAILED DESCRIPTION OF THE PREFERRED EMBODIMENT

Figure 1:
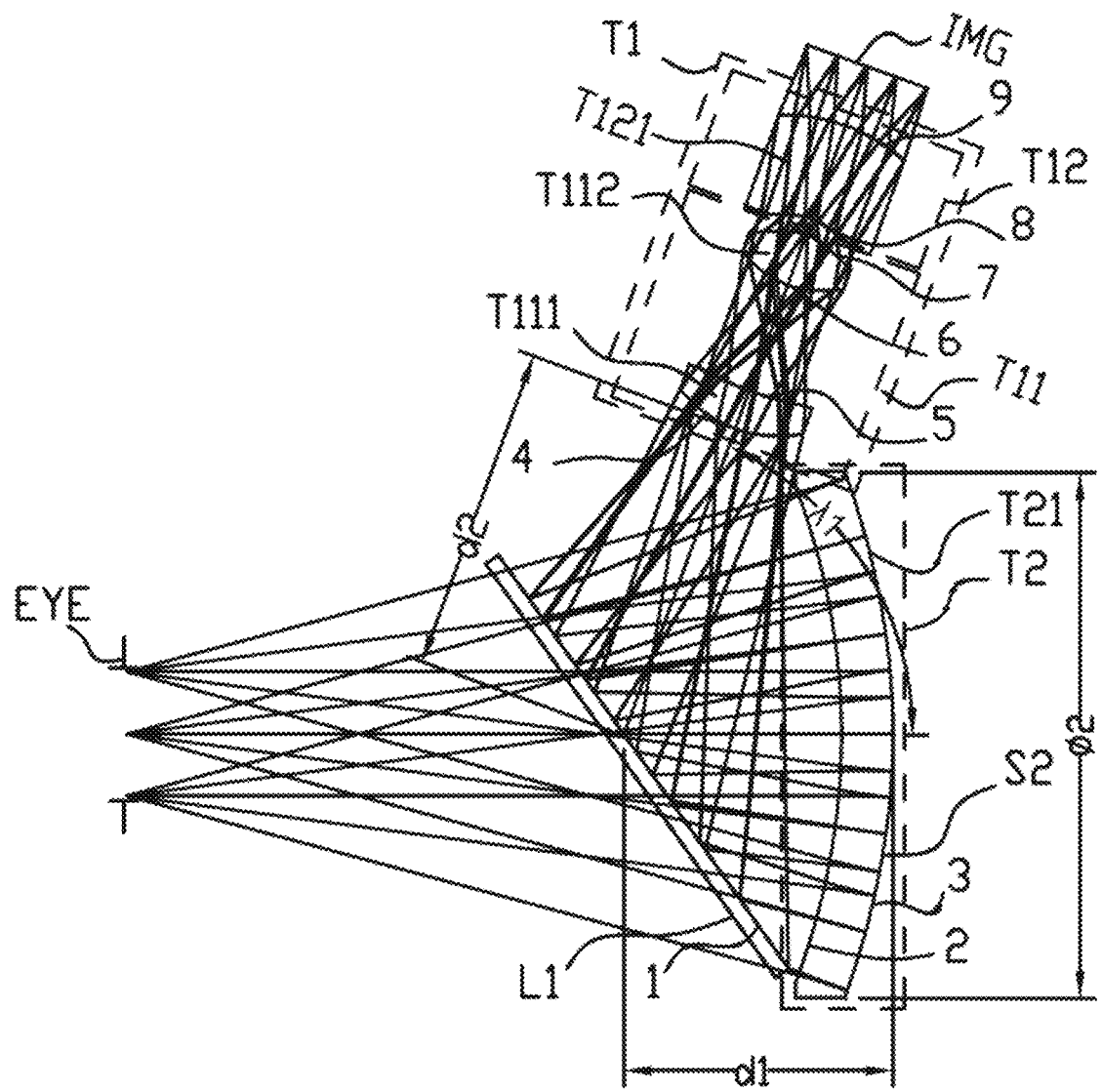
FIG. 1 is an optical path structural diagram of a reflective eyepiece optical system according to a first embodiment of the present invention.
Figure 2:
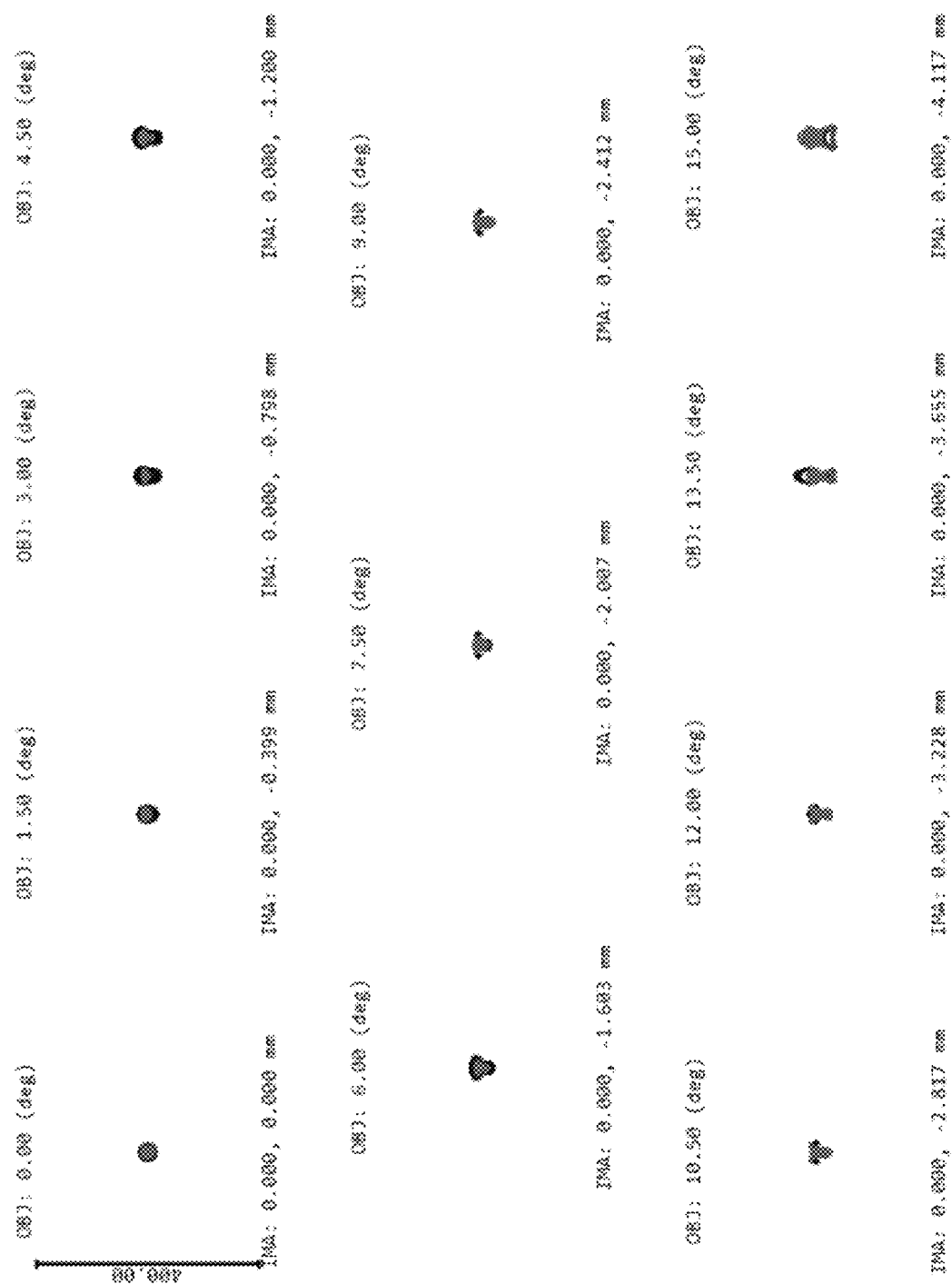
FIG. 2 is a schematic diagram of a spot diagram of the reflective eyepiece optical system according to the first embodiment of the present invention.
Figure 3A:
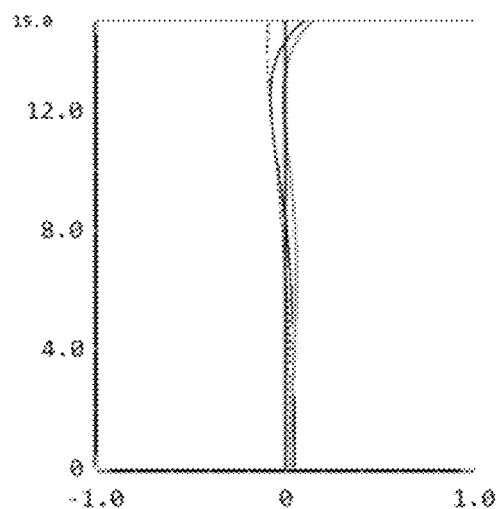
FIG. 3a is a schematic diagram of a field curvature of the reflective eyepiece optical system according to the first embodiment of the present invention.
Figure 3B:
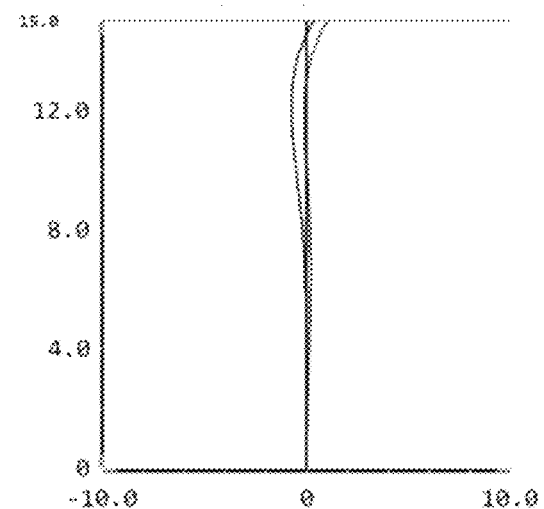
FIG. 3b is a schematic diagram of a distortion of the reflective eyepiece optical system according to the first embodiment of the present invention.
Figure 4:
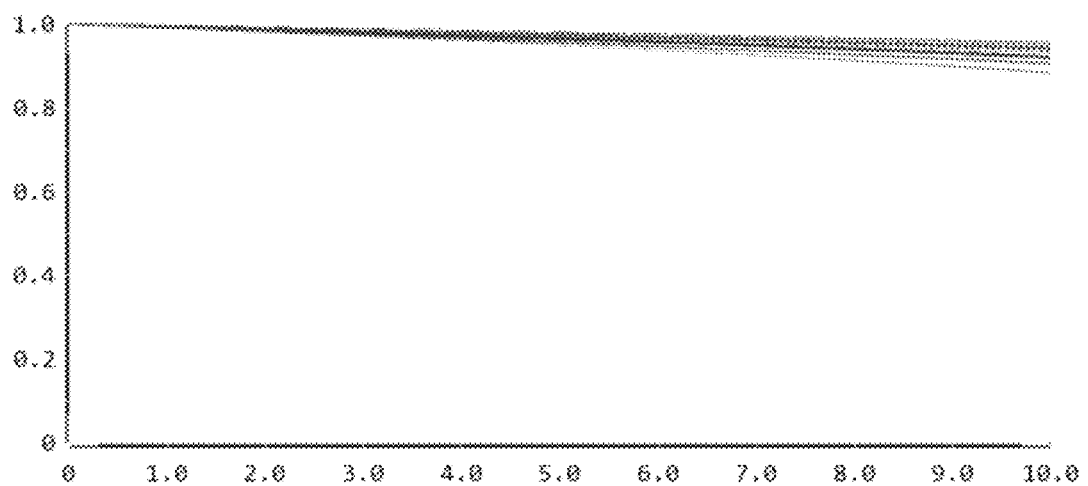
FIG. 4 is a schematic diagram of an optical modulation transfer function (MTF) of the reflective eyepiece optical system according to the first embodiment of the present invention.

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any inventive work based on the embodiments disclosed in the present invention fall into the scope of the present invention.

The present invention constructs a reflective eyepiece optical system, including: a first lens group, a first optical element and a second lens group for transmitting and reflecting light from a miniature image displayer; the second lens group includes an optical reflection surface, and the optical reflection surface is the optical surface farthest from a human eye viewing side in the second lens group; the optical reflection surface is concave to the human eyes; the first optical element reflects the light refracted by the first lens group to the second lens group, and then transmits the light refracted, reflected and again refracted by the second lens group to the human eyes;

The above-mentioned light transmission path is as follows: the light generated by the miniature image displayer is refracted by the first lens group and then transmitted to the first optical element, and the reflection part on the first optical element reflects the light into the second lens group. Since the optical reflection surface in the second lens group is disposed on the optical surface farthest from the human eye viewing side, the light will be refracted once in the second lens group before entering the optical reflection surface, and when it reaches the optical reflection surface, it will be reflected by the optical reflection surface onto the first optical element. Before the light reflected by the optical reflection surface reaches the first optical element, it will be refracted to the first optical element through other optical surfaces in the second lens group, and the light-transmitting part on the first optical element will transmit the light to the human eyes.

An effective focal length of the eyepiece optical system is $f_w$, an effective focal length of the first lens group is $f_1$, an effective focal length of the second lens group is $f_2$, and $f_w$, $f_1$, and $f_2$ satisfy the following relations (1) and (2):

$$f_1/f_w < -0.50 \tag{1};$$

$$f_2/f_w < -0.70 \tag{2};$$

wherein, a value of $f_1/f_w$ may be −0.50, −0.579, −1.462, −3.398, −11.295, −23.931, −30.891, −44.751, −51.535, −70.479, etc., and a value of $f_2/f_w$ may be −0.70, −0.79, −1.93, −3.59, −11.35, −31.12, −45.08, −50.91, −71.88, −80.73, −100.649, etc.

The first lens group includes a first sub-lens group and a second sub-lens group arranged coaxially and successively along an optical axis direction from a human eye viewing side to the miniature image displayer side; the effective focal lengths of the first sub-lens group and the second sub-lens group are a combination of positive and negative; the effective focal length of the first sub-lens group is $f_{11}$, the effective focal length of the second sub-lens group is $f_{12}$, and $f_{11}$, $f_{12}$ and f1 satisfy the following relations (3) and (4):

$$0.59 < f_{11}/f_1 \tag{3};$$

$$f_{12}/f_1 < -0.90 \tag{4}.$$

wherein, a value of $f_{11}/f_1$ may be 0.59, 0.77, 0.89, 1.35, 3.25, 5.56, 36.1, 54.1, 87.6, etc., and a value of $f_{12}/f_1$ may be −0.90, −0.925, −1.47, −3.55, −6.25, −8.33, −11.78, −21.13, −32.55, −53.15, −74.14, −94.78, etc.

In the above relations (1), (2), (3) and (4), the value ranges of $f_1/f_w$, $f_2/f_w$, $f_{11}/f_1$ and $f_{12}/f_1$ are closely related to sensitivities of a correction of system aberrations, a processing difficulty of optical members, and assembly deviations of the optical elements, wherein the value of $f_1/f_w$ in relation (1) is less than −0.50, which improves the processability of the optical elements in the system; the value of $f_2/f_w$ in relation (2) is less than −0.70, so that the system aberration can be fully corrected, so as to achieve higher quality optical effects. The value of $f_{11}/f_1$ in relation (3) is greater than 0.59, so that the system aberration can be fully corrected, so as to achieve quality optical effects; the value of $f_{12}/f_1$ in relation (4) is less than −0.90, which reduces difficulty of spherical aberration correction and facilitates realization of a large optical aperture.

The first lens group includes two sub-lens groups, which are respectively a first sub-lens group and a second sub-lens group arranged adjacently, the first sub-lens group and the second sub-lens group adopt a combination of positive and negative focal lengths. Wherein the negative lens group corrects aberrations and the positive lens group provides focused imaging. With the focal length combination of positive and negative, it can better correct aberrations, has a good processability and lower cost, and improves the optical resolution of the system.

More importantly, with the transmission and reflection properties of the first optical element and the second lens group, the second optical element includes a reflective surface to effectively fold the optical path, which reduces the overall size of the eyepiece optical system, and improves the possibility of subsequent mass production. Meanwhile, the second lens group and the focal length combination relationship between the first sub-lens group and the second sub-lens group are provided to further correct aberrations and have better processibility. On the basis of miniaturization, cost and weight reduction for the article, the aberration of the optical system is greatly eliminated, and the basic optical indicators are also improved to ensure high imaging quality and increase the size of the picture angle. Thus an observer can watch large images of full frame, high definition and uniform image quality without any distortion and get visual experience of high liveness via the present invention, and the present article is suitable for head-mounted near-to-eye display devices and similar devices.

In the above embodiment, the first optical element may be a polarizer with 75% transmission, 25% reflection or 65% transmission, 35% reflection or a transflective function.

As shown in FIG. 1, a first optical element, a second lens group, and a first lens group arranged along an optical axis direction between a human eye viewing side and a miniature image displayer are included. The optical surface closer to the human eye E side is marked as 1, and by analogy (2, 3, 4, 5, 6 . . . respectively from left to right). The light emitted from the miniature image displayer is refracted by the first lens group, and then reflected on the first optical element to the second lens group, after the second lens group refracts, reflects and refracts the light again, the first optical element transmits the light transmitted by the second lens group to the human eyes.

In a further embodiment, the distance along the optical axis between the first optical element and the second lens group is $d_1$, the distance along the optical axis between the first optical element and the first lens group is $d_2$, and $d_1$ and $d_2$ satisfy the following relation (5):

$$0.69 < d_2/d_1 \qquad (5).$$

wherein, a value of d2/d1 may be 0.69, 0.83, 0.88, 0.98, 1.55, 2.37, 3.55, 3.88, 3.99, 4.57, 4.89, 4.99, etc.

The lower limit of $d_2/d_1$ in the above relation (5) is greater than 0.69, which reduces difficulty of correcting an off-axis aberration of the system, and ensures that both a central field-of-view and an edge field-of-view achieve high image quality, so that the image quality in the full frame is uniform.

In a further embodiment, a maximum effective optical caliber of the second lens group is $\varphi_2$, and $\varphi_2$ satisfies the following relation (6):

$$\varphi_2 < 70 \text{ mm} \qquad (6).$$

wherein, a value of $\varphi_2$ may be 70, 69, 65, 56, 52, 48, 32, 30, 28, 26, 21, etc., in mm.

In a further embodiment, the first sub-lens group is composed of two lenses; wherein the first sub-lens group includes a first lens and a second lens that are coaxially arranged successively along the optical axis from a human eye viewing side to a miniature image displayer side; both the first lens and the second lens are positive lenses.

In a further embodiment, the effective focal length of the first lens is $f_{111}$, and the effective focal length of the first sub-lens group is $f_{11}$, $f_{111}$ and $f_{11}$ satisfy the following relation (7):

$$2.41 < |f_{111}/f_{11}| \qquad (7).$$

wherein, a value of $|f_{111}/f_{11}|$ may be 2.41, 2.48, 2.72, 3.88, 4.32, 6.55, 7.25, 9.57, 15.57, 28.79, 69.91, 80.11, 100.22, etc.

The value of $|f_{111}/f_{11}|$ in the above relation (7) is greater than 2.41, so that the system aberration can be fully corrected, so as to achieve high-quality optical effects.

In a further embodiment, the optical surface of the first lens proximate to the human eye viewing side is convex to the human eyes. It may further reduce the size of the eyepiece optical system, improve the image quality of the system, correct the distortion, and improve the aberrations such as astigmatism and field curvature of the system, which is beneficial to the high-resolution optical effect of the eyepiece system with uniform image quality across the full frame.

In a further embodiment, the second sub-lens group includes a third lens adjacent to the first sub-lens group; the optical surface of the third lens proximate to the miniature image displayer side is concave to the miniature image displayer; the third lens is a negative lens; the effective focal length of the third lens is $f_{121}$, and $f_{121}$ satisfies the following relation (8):

$$f_{121} < -9.7 \qquad (8).$$

wherein, a value of $f_{121}$ may be −9.7, −9.725, −10.47, −12.55, −15.25, −21.33, −33.78, −37.13, −42.55, −53.15, −74.14, −114.78, etc.

The value of $f_{121}$ in the above relation (9) is greater than −9.7, so that the system aberration can be fully corrected, so as to achieve higher-quality optical effects.

In one of the embodiments, the second lens group includes a fourth lens adjacent to the first optical element; the optical reflection surface is located on the optical surface of the fourth lens distant from the human eyes.

In one of the embodiments, the second lens group includes a fourth lens and a fifth lens adjacent to the first optical element; the fourth lens and the fifth lens are arranged successively along an incident direction of an optical axis of human eyes; the optical reflection surface is located on the optical surface of the fourth lens distant from the human eye.

In a further embodiment, the effective focal length of the optical reflection surface is $f_{S2}$, and the effective focal length of the second lens group is $f_2$, $f_2$ and $f_{S2}$ satisfy the following relation (9):

$$0.46 \leq f_{S2}/f_2 \leq 1.0 \qquad (9);$$

wherein, a value of $f_{S2}/f_2$ may be 0.46, 0.465, 0.467, 0.5, 0.65, 0.75, 0.87, 0.93, 0.97, 1.0, etc.

The value of $f_{S2}/f_2$ in relation (9) is greater than 0.46, so that the system aberration can be fully corrected, so as to achieve high-quality optical effects and its value of less than 1.0 improves the processibility of the optical elements in the system.

In a further embodiment, the first optical element is a planar transflective optical element, a reflectivity of the first optical element is $Re_1$, and $Re_1$ satisfies relation (10):

$$20\% < Re_1 < 80\% \qquad (10).$$

wherein, a value of $Re_1$ may be 20%, 21%, 30%, 47%, 52%, 60%, 65%, 70%, 79%, 80%, etc.

In a further embodiment, a reflectivity of the optical reflection surface is $Re_2$, and $Re_2$ satisfies relation (11):

$$20\% < Re_2 \qquad (11).$$

wherein, a value of $Re_2$ may be 20%, 21%, 30%, 47%, 52%, 60%, 65%, 70%, 80%, 99%, etc.

In a further embodiment, an angle of optical axis between the first lens group and the second lens group is $\lambda_1$, and $\lambda_1$ satisfies the following relation (12):

$$55° < \lambda_1 < 120° \qquad (12).$$

wherein, a value of $\lambda_1$ may be 55°, 60°, 66°, 70°, 90°, 100°, 115°, 120°, etc.

In a further embodiment, the effective focal length $f_1$ of the first lens group, the effective focal length $f_{11}$ of the first sub-lens group, the effective focal length $f_{12}$ of the second sub-lens group, and the effective focal length $f_{111}$ of the first lens, further satisfy the following relations (13), (14) and (15):

$$0.65 < f_{11}/f_1 < 0.67 \qquad (13);$$

$$2.41 < f_{111}/f_{11} < 14.10 \qquad (14);$$

$$-1.75 < f_{12}/f_1 < -0.90 \qquad (15).$$

wherein, a value of $f_{11}/f_1$ may be 0.650, 0.651, 0.653, 0.657, 0.659, 0.665, 0.667, 0.669, 0.67, etc., a value of $f_{111}/f_{11}$ may be 2.41, 2.44, 3.28, 5.04, 6.92, 8.78, 9.38, 11.268, 13.17, 14.09, 14.10, etc., and a value of $f_{12}/f_1$ may be −1.75, −1.745, −1.74, −1.68, −1.635, −1.53, −1.48, −1.33, −1.25, −1.15, −0.90, −1.04, etc.

By further optimizing the value ranges of the effective focal length of the first sub-lens group, the second sub-lens group, the third sub-lens group and the system, the optical performance and difficulty of processing and manufacturing of the optical system are better balanced.

In one of the embodiments, the eyepiece optical system further includes a planar reflective optical element located between the first lens group and the first optical element; the planar reflective optical element reflects the light refracted by the first lens group to the first optical element, the first optical element reflects the light to the second lens group, and then transmits the light refracted, reflected and refracted again by the second lens group to the human eyes;

the angle between the first lens group and the first optical element is $\lambda_2$, and $\lambda_2$ satisfies the following relation (17):

$$60° \leq \lambda_2 \leq 180° \qquad (17);$$

wherein, a value of $\lambda_2$ may be 60°, 74°, 80°, 90°, 100°, 130°, 140°, 155°, 167°, 180°, etc.

In a further embodiment, the first lens group includes one or more even-order aspherical face shapes; the optical surface of the fourth lens and the optical surface of the fifth lens are both even-order aspherical face shapes; the optical reflection surface is even-order aspherical face shape.

In a further embodiment, the even-order aspherical face shapes satisfy the following relation (16):

$$z = \frac{cr^2}{1 + \sqrt{1 - (1+k)c^2 r^2}} + \alpha_2 r^2 + \alpha_4 r^4 + \alpha_6 r^6 + \ldots; \qquad (16)$$

wherein, Z is a vector height of the optical surface, c is a curvature at the aspherical vertex, k is an aspherical coefficient, and α2, 4, 6 . . . are coefficients of various orders, and r is a distance coordinate from a point on a surface to an optical axis of a lens system.

The aberrations of the optical system (including spherical aberration, coma, distortion, field curvature, astigmatism, chromatic aberration and other higher-order aberrations) are fully corrected, which is beneficial for the eyepiece optical system, while realizing a large angle of view and a large aperture, to further improve the image quality of the central field-of-view and the edge field-of-view reduce the image quality difference between the central field-of-view and the edge field-of-view, achieving more uniform image quality and low distortion in the full frame.

In a further embodiment, the material of each lens in the second lens group is an optical plastic material, such as E48R, EP5000, OKP1, etc.

The aberrations at all levels of the eyepiece optical system are fully corrected, and the manufacturing cost of the optical element and the weight of the optical system are also controlled.

The principles, solutions and display results of the above-mentioned eyepiece optical system will be further described below through more specific examples.

In the following examples, the diaphragm E may be the exit pupil of imaging for the eyepiece optical system, which is a virtual light exit aperture. When the pupils of the human eyes are at the diaphragm position, the best imaging effect can be observed. The spot diagram provided in the following example reflects a geometric structure of an imaging of the optical system, with ignoring a diffraction effect, and is represented by dispersion spots formed by a cross-section of a focused image plane of specified field of view and light of specified wavelength, and can include multiple fields of view and light of multiple wavelengths at the same time. Therefore, an imaging quality of the optical system can be directly measured by a density, shape and size of dispersion spots of the spot diagram, and a chromatic aberration of the optical system can be directly measured by a dislocation degree of dispersion spots of different wavelengths of the spot diagram. The smaller a radius (root mean square radius) of RMS (Root Meam Square) of the spot diagram, the higher the imaging quality of the optical system.

Example 1

The eyepiece design data of Example 1 is shown in Table 1 below:

TABLE 1

| Surface | Lens | | | | | |
| --- | --- | --- | --- | --- | --- | --- |
| | Curvature radius (mm) | Thickness (mm) | Refractive index | Abbe number | Net caliber (mm) | Cone coefficient |
| Diaphragm | Infinite | 47 | | | 4 | |
| 2 | −44.5861 | 2.31 | 1.94595 | 17.943914 | 31.63327 | |
| 3 | −44.95739 | −2.31 | | MIRROR | 33.09 | 1.592948 |
| 4 | −44.5861 | −15.0005 | | | 31.41075 | |
| 5 | Infinite | 20.961524 | | MIRROR | 36.89176 | |
| 6 | −39.15957 | 2.638531 | 1.6595 | 57.385393 | 8.390929 | −58.33417 |
| 7 | 24.4395 | 7.234577 | | | 7.411925 | |
| 8 | 6.351206 | 3.43066 | 1.517602 | 63.502624 | 6.938341 | −2.009548 |
| 9 | −3.192325 | 1.118256 | | | 6.818412 | −3.587651 |
| 10 | −3.255389 | 6.37417 | 1.945958 | 17.943914 | 6.421401 | −4.868598 |
| 11 | −11.40388 | 4.054051 | | | 8.604693 | |
| Image plane | Infinite | | | | 8.289112 | |

FIG. 1 is an optical path diagram of the eyepiece optical system of Example 1, including: a first lens group T1, and a first optical element L1 and a second lens group T2 for transmitting and reflecting light from the miniature image displayer IMG; the second lens group T2 includes an optical reflection surface S2, and the optical reflection surface S2 is the optical surface farthest from the human eye viewing side in the second lens group T2; the optical reflection surface S2 is concave to the human eye viewing direction; the first optical element L1 reflects the light refracted by the first lens group T1 to the second lens group T2, and then transmits the light refracted, reflected and refracted again by the second lens group T2 to the human eyes EYE.

The first lens group T1 includes a first sub-lens group T11 and a second sub-lens group T12, the first sub-lens group T11 is a positive lens group, the second sub-lens group T12 is a negative lens group, and the first sub-lens group T11 is composed of two lenses, respectively a first lens T111 distant from the miniature image displayer IMG side and a second lens T112 proximate to the miniature image displayer IMG side; both the first lens T111 and the second lens T112 are positive lenses. The second sub-lens group T12 is composed of one lens, wherein the second sub-lens group T12 includes a third lens T121 adjacent to the first sub-lens group T11; the third lens T121 is a negative lens. The second lens group T2 is composed of one lens, the second lens group T2 includes a fourth lens T21, and the optical reflection surface S2 is located on the optical surface of the fourth lens T21 distant from the human eyes EYE.

The effective focal length $f_w$ of the eyepiece optical system is −20.47, the effective focal length $f_1$ of the first lens group T1 is 12.28, and the effective focal length $f_2$ of the second lens group T2 is 16.37. The distance $d_1$ along the optical axis between the first optical element L1 and the second lens group T2 is 21.51, the distance $d_2$ along the optical axis between the first optical element L1 and the first lens group T1 is 17.86, the effective focal length $f_{11}$ of the first sub-lens group T11 is 13.27, and the effective focal length $f_{12}$ of the second sub-lens group T12 is −22.14, the effective focal length $f_{111}$ of the first lens $T_{111}$ is 9.08. Then $f_1/f_w$ is −0.6, $f_2/f_w$ is −0.8, $f_{11}/f_1$ is 1.08, $f_{111}/f_1$ is 0.68, $f_{12}/f_1$ is −1.8, $f_121$ is −22.14, $f_{S2}/f_2$ is 0.64, $d_2/d_1$ is 0.7, and $\lambda_1$ is 70°.

FIGS. 2, 3a, 3b and 4 are respectively a spot diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

Example 2

The eyepiece design data of Example 2 is shown in Table 2 below:

TABLE 2

| Surface | Lens Curvature radius (mm) | Thickness (mm) | Refractive index | Abbe number | Net caliber (mm) | Cone coefficient |
|---|---|---|---|---|---|---|
| Diaphragm | Infinite | 47 | | | 4 | |
| 2 | −25.66799 | 1.32 | 1.50463 | 64.779923 | 30.4969 | |
| 3 | −36.25699 | −1.32 | | MIRROR | 32.58141 | 0.8850376 |
| 4 | −25.66799 | −20.00047 | | | 29.9337 | |
| 5 | Infinite | 19.5257 | | MIRROR | 14.93087 | |
| 6 | −11.28608 | 2.195206 | 1.470466 | 66.884514 | 7.443474 | −0.6008671 |
| 7 | 8.790018 | 2.571593 | | | 7.456313 | |
| 8 | 26.64507 | 4.139851 | 1.804009 | 46.567682 | 8.987079 | −24.70747 |
| 9 | −9.325884 | 0.02819912 | | | 9.311513 | −1.326994 |
| 10 | −8.758105 | 6.055835 | 1.92286 | 18.895456 | 9.284746 | −0.5322041 |
| 11 | −15.94407 | 15.01537 | | | 11.20103 | |
| Image plane | Infinite | | | | 9.587204 | |

Figure 5:
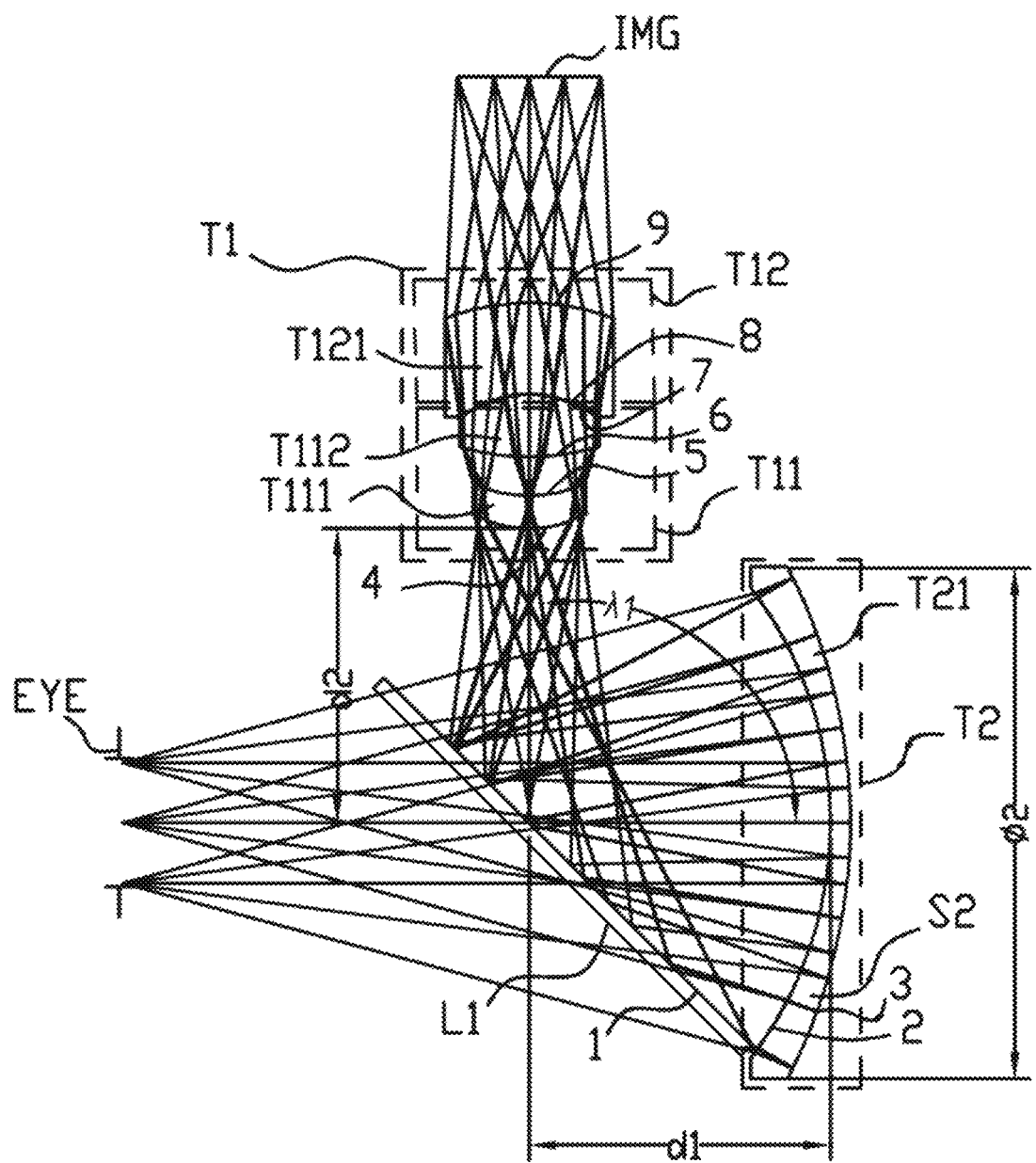
FIG. 5 is an optical path structural diagram of a reflective eyepiece optical system according to a second embodiment of the present invention.
Figure 6:
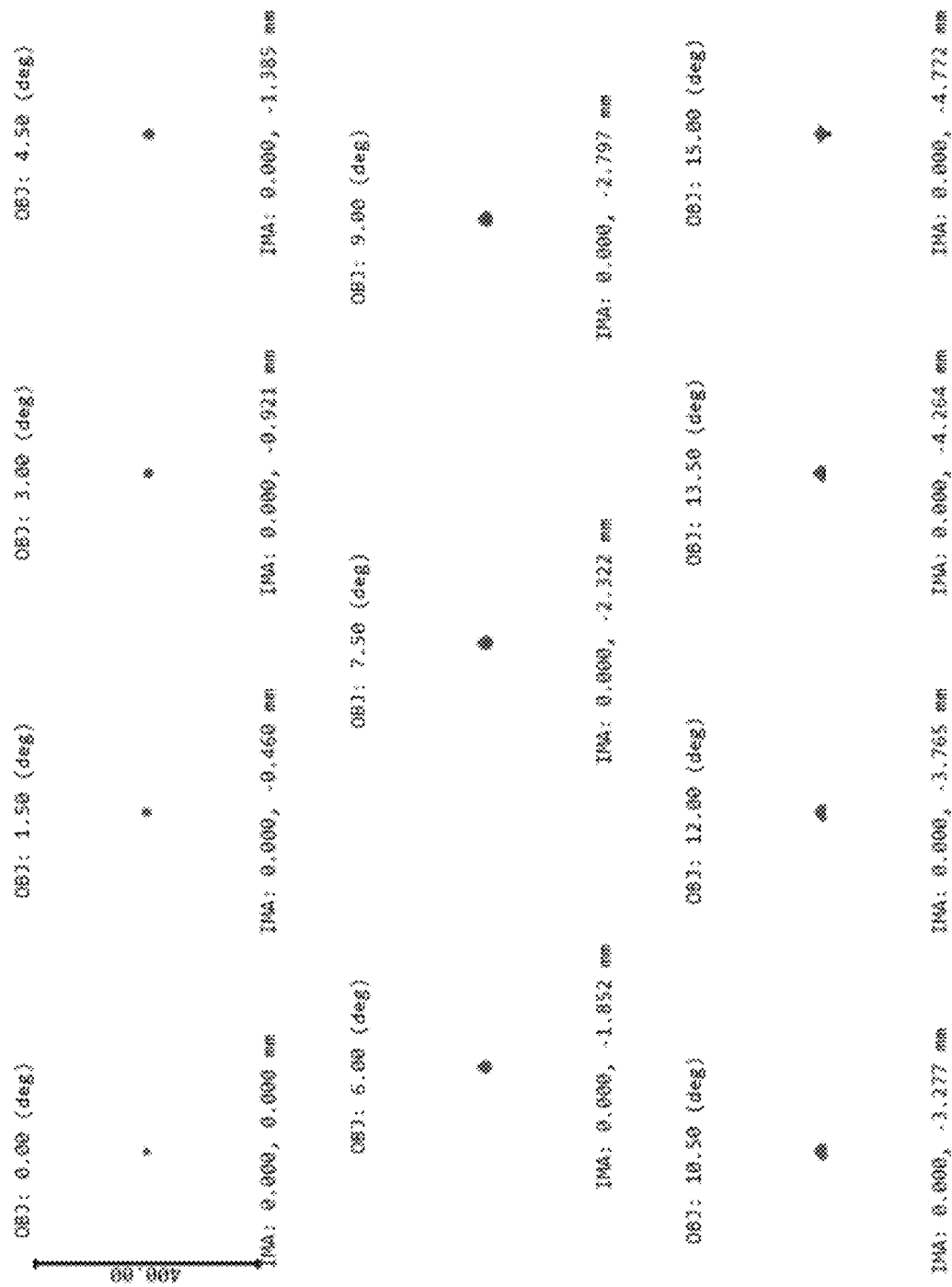
FIG. 6 is a schematic diagram of a spot diagram of the reflective eyepiece optical system according to the second embodiment of the present invention.
Figure 7A:
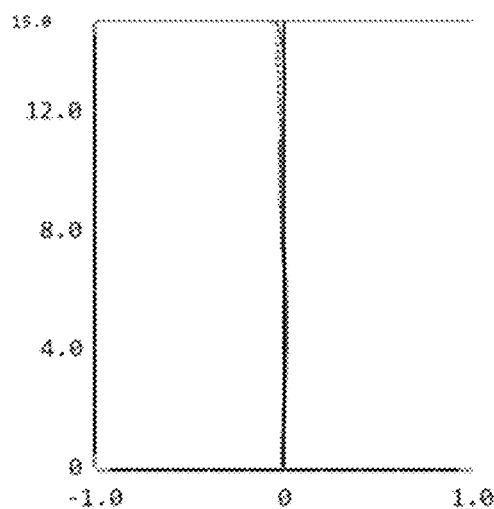
FIG. 7a is a schematic diagram of a field curvature of the reflective eyepiece optical system according to the second embodiment of the present invention.
Figure 7B:
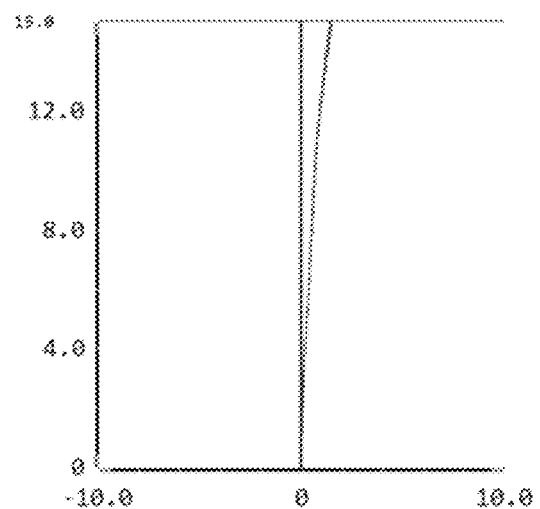
FIG. 7b is a schematic diagram of a distortion of the reflective eyepiece optical system according to the second embodiment of the present invention.
Figure 8:
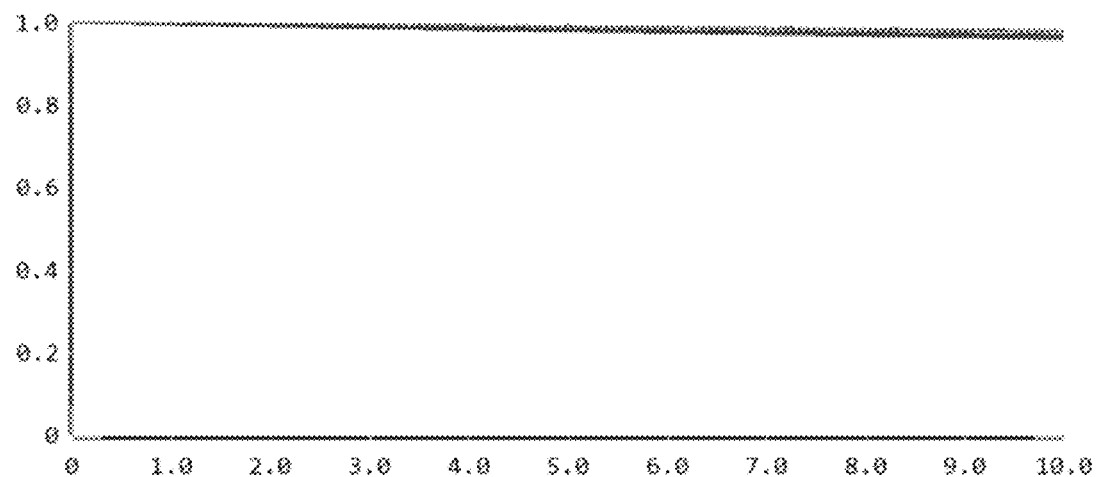
FIG. 8 is a schematic diagram of an optical MTF of the reflective eyepiece optical system according to the second embodiment of the present invention.

FIG. 5 is an optical path diagram of the eyepiece optical system of Example 2, including: a first lens group T1, and a first optical element L1 and a second lens group T2 for transmitting and reflecting light from the miniature image displayer IMG; the second lens group T2 includes an optical reflection surface S2, and the optical reflection surface S2 is the optical surface farthest from the human eye viewing side in the second lens group T2; the optical reflection surface S2 is concave to the human eye viewing direction; the first optical element L1 reflects the light refracted by the first lens group T1 to the second lens group T2, and then transmits the light refracted, reflected and refracted again by the second lens group T2 to the human eyes EYE.

The first lens group T1 includes a first sub-lens group T11 and a second sub-lens group T12, the first sub-lens group T11 is a positive lens group, the second sub-lens group T12 is a negative lens group, and the first sub-lens group T11 is composed of two lenses, respectively a first lens T111 distant from the miniature image displayer IMG side and a second lens T112 proximate to the miniature image displayer IMG side; both the first lens $T_{111}$ and the second lens $T_{112}$ are positive lenses. The second sub-lens group T12 is composed of one lens, wherein the second sub-lens group T12 includes a third lens T121 adjacent to the first sub-lens group $T_{11}$; the third lens T121 is a negative lens. The second lens group T2 is composed of one lens, the second lens group T2 includes a fourth lens T21, and the optical reflection surface S2 is located on the optical surface of the fourth lens T21 distant from the human eyes EYE.

The effective focal length $f_w$ of the eyepiece optical system is −17.54, the effective focal length $f_1$ of the first lens group T1 is 11.38, and the effective focal length $f_2$ of the second lens group T2 is 21.79. The distance $d_1$ along the optical axis between the first optical element L1 and the second lens group T2 is 21.32, the distance $d_2$ along the optical axis between the first optical element L1 and the first lens group T1 is 19.53, the effective focal length $f_{11}$ of the first sub-lens group T11 is 6.85, and the effective focal length $f_{12}$ of the second sub-lens group T12 is −22.14, the effective focal length $f_{111}$ of the first lens T11 is 53.76. Then $f_1/f_w$ is −0.65, $f_2/f_w$ is −1.24, $f_{11}/f_1$ is 0.6, $f_{111}/f_{11}$ is 7.85, $f_{12}/f_1$ is −1.95, $f_{121}$ is −22.14, $f_{S2}/f_2$ is 0.55, $d_2/d_1$ is 0.92, and $\lambda_1$ is 90°.

FIGS. 6, 7a, 7b and 8 are respectively a spot diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

Example 3

The eyepiece design data of Example 3 is shown in Table 3 below:

TABLE 3

| Surface | Curvature radius (mm) | Thickness (mm) | Refractive index | Abbe number | Net caliber (mm) | Cone coefficient |
|---|---|---|---|---|---|---|
| Diaphragm | Infinite | 37 | | | 4 | |
| 2 | 62.28 | 1.02 | 1.50463 | 64.779923 | 30.4969 | |
| 3 | 62.28 | 9 | | | 30.4969 | |
| 4 | −25.66799 | 1.32 | 1.50463 | 64.779923 | 30.4969 | |
| 5 | −36.25699 | −1.32 | | MIRROR | 32.58141 | 0.8850376 |
| 6 | −25.66799 | −9.0 | | | 29.9337 | |
| 7 | 62.28 | −1.0 | 1.50463 | 64.779923 | | |
| 8 | 62.28 | −10.0 | | | | |
| 9 | Infinite | 19.5257 | | MIRROR | 14.93087 | |
| 10 | −11.28608 | 2.195206 | 1.470466 | 66.884514 | 7.443474 | −0.6008671 |
| 11 | 8.790018 | 2.571593 | | | 7.456313 | |
| 12 | 26.64507 | 4.139851 | 1.804009 | 46.567682 | 8.987079 | −24.70747 |
| 13 | −9.325884 | 0.02819912 | | | 9.311513 | −1.326994 |
| 14 | −8.758105 | 6.055835 | 1.92286 | 18.895456 | 9.284746 | −0.5322041 |
| 15 | −15.94407 | 15.01537 | | | 11.20103 | |
| Image plane | Infinite | | | | 9.587204 | |

Figure 9:
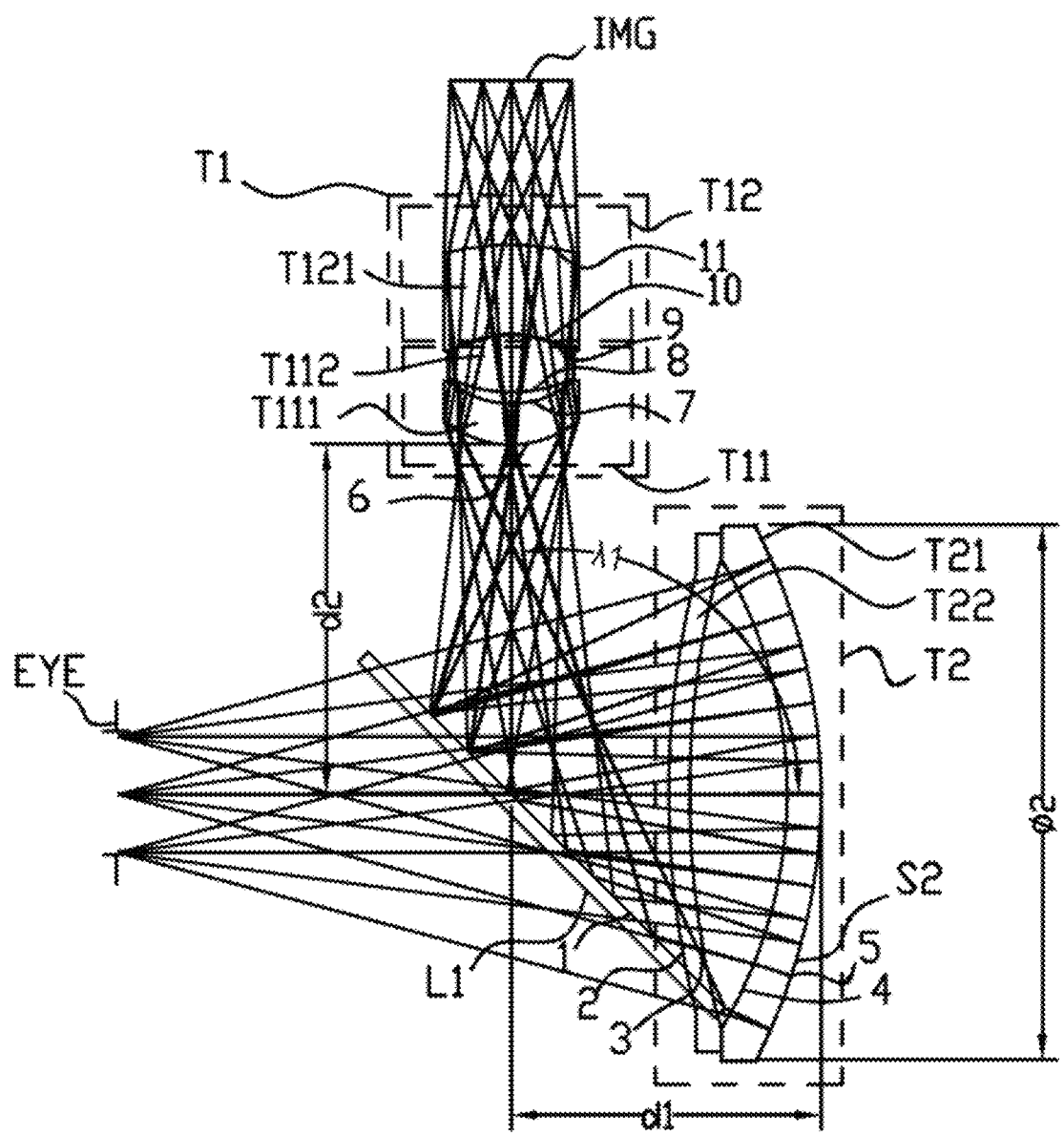
FIG. 9 is an optical path structural diagram of a reflective eyepiece optical system according to a third embodiment of the present invention.
Figure 10:
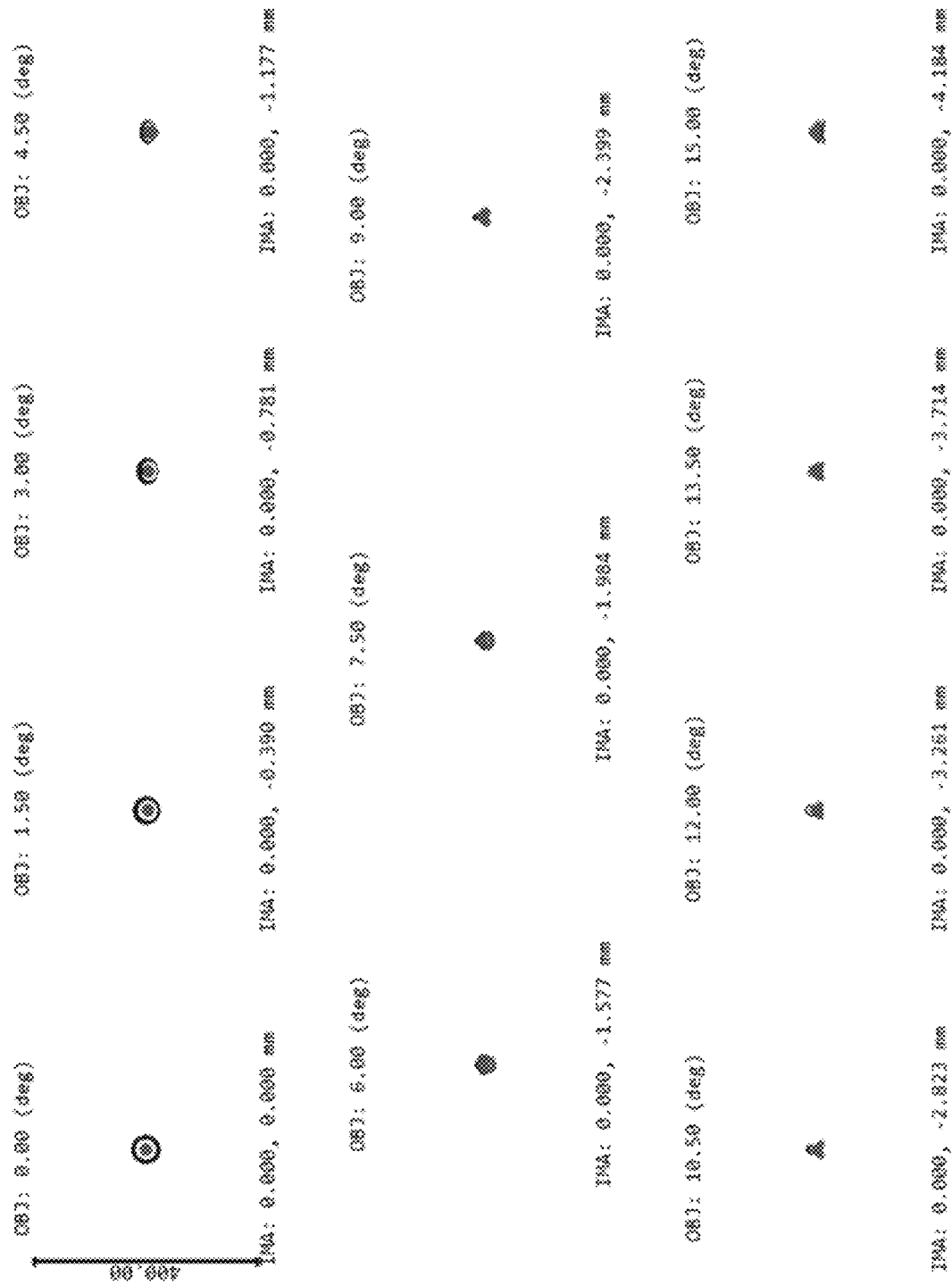
FIG. 10 is a schematic diagram of a spot diagram of the reflective eyepiece optical system according to the third embodiment of the present invention.
Figure 11A:
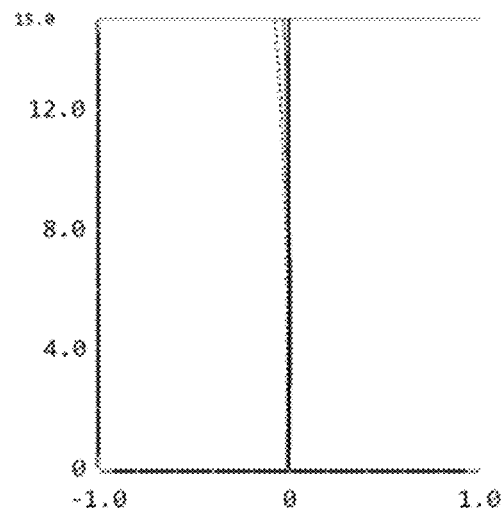
FIG. 11a is a schematic diagram of a field curvature of the reflective eyepiece optical system according to the third embodiment of the present invention.
Figure 11B:
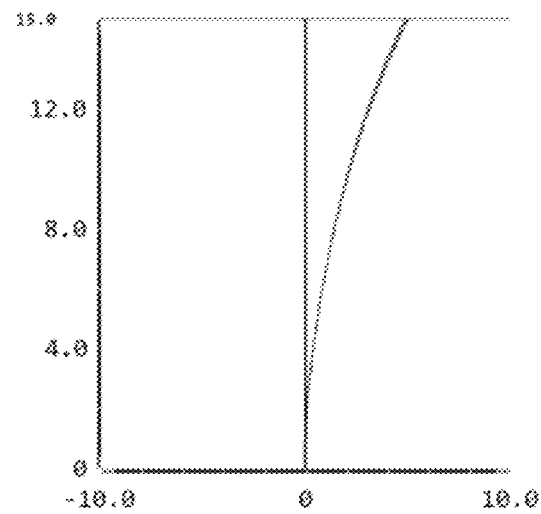
FIG. 11b is a schematic diagram of a distortion of the reflective eyepiece optical system according to the third embodiment of the present invention.
Figure 12:
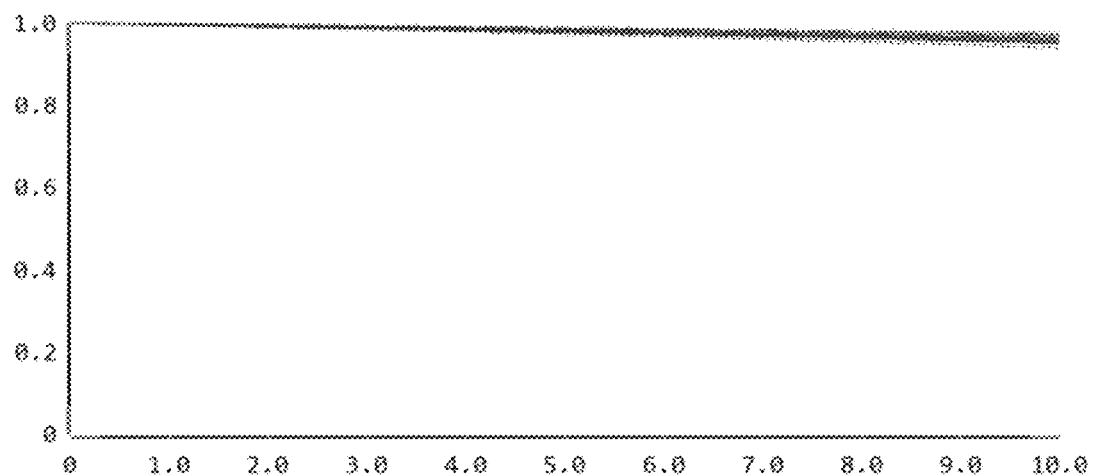
FIG. 12 is a schematic diagram of an optical MTF of the reflective eyepiece optical system according to the third embodiment of the present invention.

FIG. 9 is an optical path diagram of the eyepiece optical system of Example 3, including: a first lens group T1, and a first optical element L1 and a second lens group T2 for transmitting and reflecting light from the miniature image displayer IMG; the second lens group T2 includes an optical reflection surface S2, and the optical reflection surface S2 is the optical surface farthest from the human eye viewing side in the second lens group T2; the optical reflection surface S2 is concave to the human eye viewing direction; the first optical element L1 reflects the light refracted by the first lens group T1 to the second lens group T2, and then transmits the light refracted, reflected and refracted again by the second lens group T2 to the human eyes EYE.

The first lens group T1 includes a first sub-lens group T11 and a second sub-lens group T12, the first sub-lens group T11 is a positive lens group, the second sub-lens group T12 is a negative lens group, and the first sub-lens group T11 is composed of two lenses, respectively a first lens T111 distant from the miniature image displayer IMG side and a second lens T112 proximate to the miniature image displayer IMG side; both the first lens T111 and the second lens T112 are positive lenses. The second sub-lens group T12 is composed of one lens, wherein the second sub-lens group T12 includes a third lens T121 adjacent to the first sub-lens group T11; the third lens T121 is a negative lens. The second lens group T2 is composed of one lens, the second lens group T2 includes a fourth lens T21 and a fifth lens T22 arranged successively along the incident direction of the optical axis of the human eyes, and the optical reflection surface S2 is located on the optical surface of the fourth lens T21 distant from the human eyes EYE.

The effective focal length $f_w$ of the eyepiece optical system is −14.87, the effective focal length $f_1$ of the first lens group T1 is 10.58, and the effective focal length $f_2$ of the second lens group T2 is 22.4. The distance $d_1$ along the optical axis between the first optical element L1 and the second lens group T2 is 21.32, the distance $d_2$ along the optical axis between the first optical element L1 and the first lens group T1 is 19.53, the effective focal length $f_{11}$ of the first sub-lens group T11 is 6.53, and the effective focal length $f_{12}$ of the second sub-lens group T12 is −18.45, the effective focal length $f_{111}$ of the first lens T111 is 92. Then $f_1/f_w$ is −0.71, $f_2/f_w$ is −1.51, $f_{11}/f_1$ is 0.62, $f_{111}/f_{11}$ is 14.09, $f_{12}/f_1$ is −1.74, $f_{121}$ is −18.45, $f_{S2}/f_2$ is 0.53, $d_2/d_1$ is 1.17, and $\lambda_1$ is 90°.

FIGS. 10, 11a, 11b and 12 are respectively a spot diagram, a field curvature, a distortion diagram and a transfer function MTF plot, which reflect that respective field-of-view light in this example has high resolution and small optical distortion in the unit pixel of the image plane (miniature image displayer IMG), the resolution per 10 mm per unit period reaches more than 0.8, the aberration of the optical system and the image drift are well corrected, and a display image of uniformity and high optical performance can be observed through the eyepiece optical system.

The data of the above-mentioned Examples 1 to 3 all meet the parameter requirements recorded in the Summary of the present invention, and the results are shown in the following Table 4:

TABLE 4

| | $f_1/f_w$ | $f_2/f_w$ | $f_{11}/f_1$ | $f_{111}/f_{11}$ | $f_{12}/f_1$ |
|---|---|---|---|---|---|
| Example 1 | −0.6 | −0.8 | 1.08 | 0.68 | 4.8 |
| Example 2 | −0.65 | −1.24 | 0.6 | 7.85 | −1.95 |
| Example 3 | −0.71 | −1.51 | 0.62 | 14.09 | −1.74 |

The present application provides a head-mounted near-to-eye display device, including a miniature image displayer, and further including the reflective eyepiece optical system according to any one of the foregoing content; and the eyepiece optical system is located between the human eyes and the miniature image displayer.

Preferably, the miniature image display is an organic electroluminescent device.

Preferably, the head-mounted near-to-eye display device includes two identical reflective eyepiece optical systems.

To sum up, the first lens group of the reflective eyepiece optical system in the above examples of the present invention includes two sub-lens groups, which are the first sub-lens group and the second sub-lens group, respectively, the effective focal lengths of the first sub-lens group and the second sub-lens group adopt a combination of positive and negative, which fully corrects the aberration of the system and improves the optical resolution of the system. More importantly, with the transmission and reflection properties of the first optical element and the second lens group, the second lens group includes an optical reflection surface, which effectively folds the optical path, reduces the overall size of the eyepiece optical system, and improves the possibility of subsequent mass production. On the basis of miniaturization, cost and weight reduction for the article, the aberration of the optical system is greatly eliminated, and the basic optical indicators are also improved, ensuring high image quality and increasing the size of the picture angle. Thus an observer can watch large images of full frame, high definition and uniform image quality without any distortion and get visual experience of high liveness via the present invention, and the present article is suitable for head-mounted near-to-eye display devices and similar devices.

It should be understood that, for one of ordinary skill in the art, the foregoing description can be modified or altered, and all such modifications and alterations fall into the scope of the attached claims of the present invention.

What is claimed is:

1. A reflective eyepiece optical system, comprised of: a first lens group, a first optical element and a second lens group for transmitting and reflecting light from a miniature image displayer; the second lens group comprises an optical reflection surface, and the optical reflection surface is the optical surface farthest from a human eye viewing side in the second lens group; the optical reflection surface is concave to human eyes; the first optical element reflects the light refracted by the first lens group to the second lens group, and then transmits the light refracted, reflected and again refracted by the second lens group to the human eyes;

an effective focal length of the eyepiece optical system is $f_w$, an effective focal length of the first lens group is $f_1$, an effective focal length of the second lens group is $f_2$, and $f_w$, $f_1$, $f_2$ satisfy the following relations (1), (2):

$$f_1/f_w < -0.50 \quad (1);$$

$$f_2/f_w < -0.70 \quad (2);$$

the first lens group is comprised of a first sub-lens group and a second sub-lens group arranged coaxially and successively along the optical axis direction from a human eye viewing side to the miniature image displayer side; the effective focal length of the first sub-lens group is positive and the effective focal length of the second sub-lens group is negative; the effective focal length of the first sub-lens group is $f_{11}$, the effective focal length of the second sub-lens group is $f_{12}$, and $f_{11}$, $f_{12}$ and $f_1$ satisfy the following relations (3), (4):

$$0.59 < f_{11}/f_1 \quad (3);$$

$$f_{12}/f_1 < -0.90 \quad (4);$$

the first sub-lens group is composed of two lenses; wherein the first sub-lens group is comprised of a first lens and a second lens that are coaxially arranged successively along the optical axis from the human eye viewing side to the miniature image displayer side; both the first lens and the second lens are positive lenses; the second sub-lens group is comprised of a third lens adjacent to the first sub-lens group; the third lens is a negative lens.

2. The reflective eyepiece optical system according to claim 1, wherein the distance along the optical axis between the optical surface of the first optical element distant from the human eye viewing side and the optical reflection surface in the second lens group is $d_1$, the distance along the optical axis between the optical surface of the first optical element distant from the human eye viewing side and the optical surface in the first lens group closest to the human eye viewing side is $d_2$, and $d_1$ and $d_2$ satisfy the following relation (5):

$$0.69 < d_2/d_1 \quad (5).$$

3. The reflective eyepiece optical system according to claim 1, wherein a maximum effective optical caliber of the second lens group is $\varphi_2$, and $\varphi_2$ satisfies the following relation (6):

$$\varphi_2 < 70 \text{ mm} \quad (6).$$

4. The reflective eyepiece optical system according to claim 1, wherein the effective focal length of the first lens is $f_{111}$, the effective focal length of the first sub-lens group is $f_{11}$, and $f_{111}$ and $f_{11}$ satisfy the following relation (7), $$2.41 < |f_{111}/f_{11}| \quad (7).$$

5. The reflective eyepiece optical system according to claim 1, wherein the optical surface of the first lens proximate to the human eye viewing side is convex to the human eyes.

6. The reflective eyepiece optical system according to claim 1, wherein the optical surface of the third lens proximate to the miniature image displayer side is convex to the miniature image displayer; the effective focal length of the third lens is $f_{121}$, and $f_{121}$ satisfies the following relation (8):

$$f_{121} < -9.7 \quad (8).$$

7. The reflective eyepiece optical system according to claim 1, wherein the second lens group is comprised of a fourth lens and a fifth lens adjacent to the first optical element; the fourth lens and the fifth lens are arranged successively along an incident direction of an optical axis of the human eyes; the optical reflection surface is located on the optical surface of the fourth lens distant from the human eyes.

8. The reflective eyepiece optical system according to claim 1, wherein the effective focal length of the optical reflection surface is $f_{S2}$, and the effective focal length of the second lens group is $f_2$, $f_{S2}$ and $f_2$ satisfy the following relation (9):

$$0.46 \leq f_{S2}/f_2 \leq 1.0 \quad (9).$$

9. The reflective eyepiece optical system according to claim 1, wherein the first optical element is a planar transflective optical element, a reflectivity of the first optical element is $Re_1$, and $Re_1$ satisfies relation (10):

$$20\% < Re_1 < 80\% \tag{10}$$

10. The reflective eyepiece optical system according to claim 1, wherein a reflectivity of the optical reflection surface is $Re_2$, and $Re_2$ satisfies relation (11):

$$20\% < Re_2 \tag{11}$$

11. The reflective eyepiece optical system according to claim 1, wherein an angle of optical axis between the first lens group and the second lens group is $\lambda_1$, and $\lambda_1$ satisfies relation (12):

$$55° < \lambda_1 < 120° \tag{12}$$

12. The reflective eyepiece optical system according to claim 1, wherein the effective focal length $f_1$ of the first lens group, the effective focal length $f_{11}$ of the first sub-lens group, the effective focal length $f_{12}$ of the second sub-lens group, and the effective focal length $f_m$ of the first lens further satisfy the following relations (13), (14), (15):

$$0.65 < f_{11}/f_1 < 0.67 \tag{13}$$

$$2.41 < f_{111}/f_{11} < 14.10 \tag{14}$$

$$-1.75 < f_{12}/f_1 < -0.90 \tag{15}$$

13. The reflective eyepiece optical system according to claim 1, wherein the material of each lens in the second lens group is an optical plastic material.

14. The reflective eyepiece optical system according to claim 1, wherein the second lens group comprises a fourth lens adjacent to the first optical element; the optical reflection surface is located on the optical surface of the fourth lens distant from the human eyes.

15. The reflective eyepiece optical system according to claim 14, wherein the first lens group comprises one or more even-order aspherical face shapes; the optical surface of the fourth lens is even-order aspherical face shapes; the optical reflection surface is even-order aspherical face shape.

16. The reflective eyepiece optical system according to claim 15, wherein the even-order aspherical face shapes satisfy the following relation (16):

$$z = \frac{cr^2}{1 + \sqrt{1 - (1+k)c^2 r^2}} + \alpha_2 r^2 + \alpha_4 r^4 + \alpha_6 r^6 + \ldots; \tag{16}$$

wherein, Z is a vector height of the optical surface, c is a curvature at the aspherical vertex, k is an aspherical coefficient, and $\alpha 2, 4, 6 \ldots$ are coefficients of various orders, and r is a distance coordinate from a point on a surface to an optical axis of a lens system.

17. A head-mounted near-to-eye display device, comprising a miniature image displayer, wherein it further comprises the reflective eyepiece optical system according to claim 1; and the eyepiece optical system is located between the human eyes and the miniature image displayer.

18. The head-mounted near-to-eye display device according to claim 17, wherein the miniature image displayer is an organic electroluminescent device.

19. The head-mounted near-to-eye display device according to claim 17, wherein the head-mounted near-to-eye display device comprises two identical reflective eyepiece optical systems.

* * * * *